Feb. 15, 1966  ATSUMI FUKUDA  3,235,242
ROTARY FURNACE
Filed Sept. 6, 1963

INVENTOR
Atsumi Fukuda
BY Wenderoth, Lind
and Ponack, attorneys

United States Patent Office 3,235,242
Patented Feb. 15, 1966

3,235,242
ROTARY FURNACE
Atsumi Fukuda, Musashino, Tokyo, Japan, assignor to Yawata Iron & Steel Co., Ltd., Tokyo, Japan, a corporation of Japan
Filed Sept. 6, 1963, Ser. No. 307,771
Claims priority, application Japan, Mar. 15, 1961, 36/9,149
5 Claims. (Cl. 266—11)

This application is a continuation-in-part of my pending patent application Serial No. 179,104 filed March 12, 1962, now abandoned.

This invention relates to a rotary furnace for smelting the iron manufacturing material into pig iron and refining pig iron into steel. More particularly, it relates to a low speed rotating furnace of a special form for smelting the iron manufacturing material into pig iron and refining pig iron into steel.

A primary object of the present invention is to provide a rotary furnace, in which same furnace smelting of the iron manufacturing material of various kinds including small-sized iron ores, lathe chips, scraps, iron sands into pig iron and refining of the produced pig iron into steel may be carried out.

Another object of the present invention is to provide a rotary furnace, in which an effective heating may be effected by using fuels including heavy oil, dust coal and gas such as generator gas and oxygen.

A further object of the present invention is to provide a rotary furnace, in which blowing of oxygen may be carried out without needing specially high pressure and the agitation of the contents of the furnace may be carried out in spite of the low speed rotation of the furnace.

A further object of the present invention is to provide a rotary furnace of a special form, whereby refining of pig iron may be carried out more quickly and effectively than by any conventional type of rotary furnace.

Other objects and advantages of the invention will become apparent from the subsequent detailed description taken in conjunction with the accompanying drawings.

Heretofore, the rotary furnaces of various types have been applied in making high quality iron, but mainly in refining iron into steel. However, almost all of these conventional rotary furnaces are of a perfect drum type characterized in that the throttling angle on the combustion port side and that on the exhaust port side are the same to each other. The conventional rotary drum furnace of the type as above mentioned has proved to be defective mainly in the following respects. At first, the furnace must be quickly rotated for the purpose of rendering the contents of the furnace the effective agitating motion, which is decisively important particularly in refining pig iron in the rotary furnace. It is usual that the speed of rotation of the furnace amounts to from 5 to about 50 r.p.m., or 15 to 30 r.p.m. on an average. However, such a high speed rotation of the furnace may be performed only in the case of a small-sized test furnace but will be practically infeasible in the case of the large-sized furnace, as it might be very difficult to provide the large-sized furnace with such a mechanical construction so as to be able to endure severe impacts caused by the high speed rotation. When smelting the iron ores, lathe chips or scraps in the conventional rotary drum furnace while rotating the furnace with a high speed as above mentioned, the charged material will fly about and wear thereby the interior wall of the furnace. Therefore, it is usual that the iron ores are smelted in any other furnace such as blast furnace, electric furnace or the like and then the produced pig iron is charged into the rotary drum furnace for refining it. The most practical expedient to render the contents of the furnace an agitating motion in the longitudinal direction in refining the molten pig iron is said to blow oxygen under high pressure into the furnace. However, the effect of this expedient of agitating the contents will be slight, because it depends only on the pressure of oxygen blown onto the surface of the bath, and a long time will be required for completing the refining operation. Particularly, in the case of the large-sized furnace, a strong pressure will be required, which will, however, boil the iron bath only in the spot where oxygen is blown onto, thereby elevating the temperature thereof and affecting the furnace floor in that part. Consequently, a ring-formed corrosion will be formed in the interior wall of the furnace. Further, unless a large amount of the gas secondarily generated in the furnace is burnt, not only a heat loss will be caused, but also a uniform rise of temperature in the furnace may not be obtained. However, an excess amount of oxygen will be required therefor.

The apparatus according to the present invention is devised to completely eliminate the defects of the conventional rotary drum furnace as above mentioned. The essential feature of the present invention lies in the special form of the rotary furnace characterized in that the throttling angle on the combustion port side is larger than the throttling angle on the exhaust port side.

The form of the rotary furnace according to the present invention will be called infra as "conical-type." The conical-type rotary furnace according to the present invention will be characterized more in detail as follows:

(1) The throttling angle on the combustion port side should be larger than the throttling angle on the exhaust port side, that is, the former should be between 50 and 30 degrees and the latter less than 30 but more than 15 degrees.

(2) The ratio of the total interior length in the axial direction of the furnace to the interior diameter of the furnace in its largest part should be 1.8:1 to 3.0:1 and (3) The length in the axial direction of the largest part of interior diameter of the furnace should be less than a half of the total interior length in the axial direction of the furnace.

Thus, the rotary furnace according to the present invention is characterized by a conical-type rotary furnace, fulfilling the above mentioned conditions and lined with a basic refractory material.

Further, a conical-type rotary furnace according to the present invention is fitted with a heavy oil combustion device including a secondary air blowing device on the combustion port side thereof, which is removable and used for heating the contents of the furnace in smelting and refining operations. The furnace is also fitted with an oxygen blowing device including a secondary air blowing device, which is laid on the combustion port of the furnace in place of the aforesaid heavy oil combustion device when refining the molten pig iron in the furnace. The secondary air blowing device is characterized by consisting of a secondary air blowing pipe which is opened at the position deviated from the center of the horizontal axis of the furnace towards the said center so that the combustion flame may take the eddy current in the furnace, thereby to enhance the heating effect of the flame. Besides, the conical-type rotary furnace comprises a device for tilting the furnace in the longitudinal direction and a device for rotating the furnace around the horizontal axis of the furnace.

The present invention shall now be explained in detail with reference to the accompanying drawings.

Figure 1:
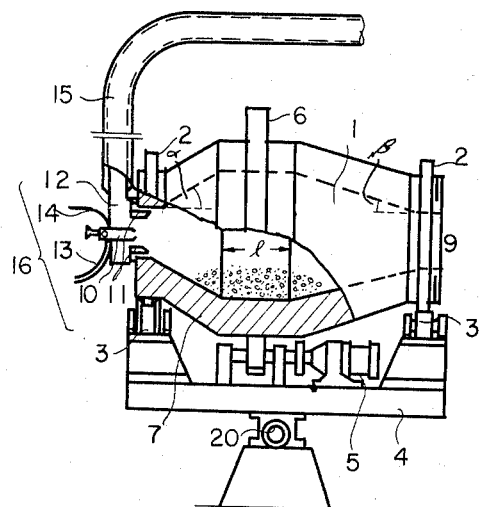
FIGURE 1 is a side view of a conical-type rotary furnace as fitted with a heavy oil combustion device on the combustion port side.
Figure 2:
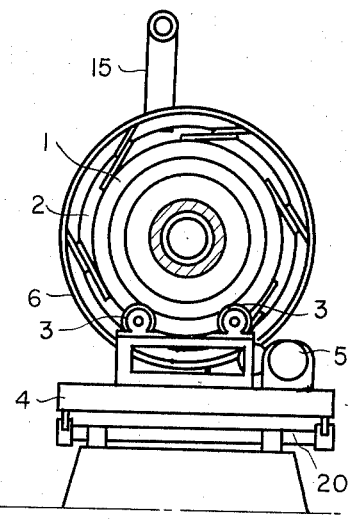
FIGURE 2 is an elevation of the same as seen from the exhaust port side.
Figure 3:
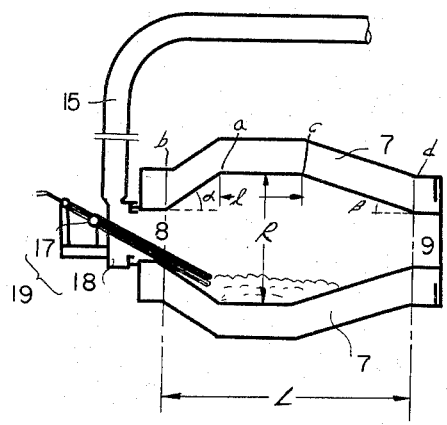
FIGURE 3 is a sketch of a cross-sectioned view of the same as fitted with an oxygen blowing device on the combustion port side.

A furnace body 1 is supported horizontally on a mount 4 by means of tires 2 and rollers 3. The rotation of a motor 5 is transmitted to a gear 6 so that the furnace body may be rotated around the horizontal axis. The rotating speed of the rotary furnace is less than 5 r.p.m., but may be higher than it, if desired. The furnace shell is made of steel plates and is lined with a basic refractory material 7 as of dolomite or magnesia series of proper thickness. As already mentioned, the furnace is characterized by the conical form, in which the throttling angle α on the combustion port side 8 is larger than the throttling angle β on the exhaust port side 9. The throttling angle designates an angle between a straight line connecting the innermost edge of the furnace port part and the edge of the part of the largest interior diameter of the furnace and the horizontal axis, that is, the angle α is that between the line connecting a and b and the horizontal axis and the angle β is that between the line connecting c and d and the horizontal axis. The ratio of the total interior length of the furnace in the horizontal direction, that is, the stretch between b and d, to the interior diameter R of the largest part of the furnace is 1.8:1 to 3.0:1. That is, the total interior length of the furnace is 1.8 to 3 times so large as the interior diameter in the largest part of the furnace. The horizontal length l of the largest part of the interior diameter, that is, the stretch between a and c is less than a half of the total interior length L of the furnace. As shown in FIG. 1, a heavy oil combustion device 16 for preheating and heating the furnace comprising a burner 10, a burner tile 11, a compulsory ventilator 12, a primary air pipe 13 and an oil feeding pipe 14, is fitted with on the combustion port side and is so constructed that a secondary hot air of 200 to 950° C. fed from a heat-insulated pipe 15 may be utilized. As shown in FIG. 2, a heat-insulated pipe 15 has an opening at the position deviated somewhat from the center of the horizontal axis so that a secondary air introduced through which opening towards the said center may take the form of eddy current. When beginning the refining of the molten pig iron the heavy oil combustion device 16 is removed and replaced by an oxygen blowing device 19, which comprises an oxygen blowing pipe 17 with a water-cooled outer tube and a compulsory ventilator 18 as shown in FIG. 3. Also in the oxygen blowing device 19 a secondary hot air fed from the heat-insulated pipe 15 may be utilized.

The criticalities of the aforesaid three conditions characterizing a conical form of the rotary furnace according to the present invention will be explained in the following: If the throttling angle α on the combustion port side is more than 50 degrees, the combustion flame or secondary hot air will be intercepted by the furnace wall of the combustion port, thereby a favorable stream thereof along the surface of the interior wall of the furnace on the combustion port side will be hindered, forming a dead angle at this part. On the contrary, if the angle α is less than 30 degrees, the combustion flame will immediately strike against the furnace wall, thereby not only the damage of the furnace wall is caused but also the length of the oxygen lance will have to be elongated unnecessarily when carrying out the oxygen blowing. Further, if the throttling angle β on the exhaust port side exceeds 30 degrees, the combustion flame or the waste gas will strike against the interior wall of the furnace on the exhaust port side, thereby a favorable stream of the flame and hot air may not be obtained and moreover the agitating effect of the rotating furnace body on the contents of the furnace will be reduced. If less than 15 degrees, a furnace capacity will be too small.

With regard to the ratio of the total interior length of the furnace to the longest interior diameter, the sufficient combustion of fuels including CO gas generated from the bath will be difficult, resulting in a loss of discharging the fuels in unburnt state into the open air, if the ratio is less than 1.8:1. If the ratio exceeds 3:1, it will be difficult to elevate uniformly the temperature within the furnace. At last, if the length of the longest part of the interior diameter of the furnace is longer than a half of the total interior length of the furnace, an agitation of the contents of the furnace will not be practically effected.

With the conical form of the rotary furnace in which the aforesaid conditions are fulfilled, it is possible to rotate the furnace with a low speed of rotations as of below 5 r.p.m. while effecting a sufficeint agitation of the contents. The significance of keeping the number of rotations will be demonstrated by the fact that if the number of rotations will exceed 5 r.p.m., the molten pig iron will splash by causing a collosion due to a too strong agitation, resulting in preoxidizing only the surface of the splashed molten pig iron and thereby producing an unfavorable effect on the whole bath. Moreover, in this case it will be difficult to determine the position of the oxygen blowing pipe and the construction of a large-sized furnace will be difficult.

The operation of the conical-type rotary furnace according to the present invention will be explained in the following. As already mentioned, smelting of the iron manufacturing material including small-sized iron ores, lathe chips, scraps and iron sands into molten pig iron and refining the produced molten pig iron into steel may be carried out in succession in the same furnace. Therefore, there is no need of using any conventional furnace such as blast furnace, open-hearth furnace, converter, or electric furnace in making steel from iron ores when adopting the steel making system of the present invention. Of course, the rotary furnace according to the present invention may be applied only for making pig iron from iron ores or making steel by charging therein molten pig iron produced in a blast furnace. It is also a great merit of this rotary furnace to be able to smelt iron ores of small size as of 50 mm. to 0.1 mm. in diameter which are not suitable for a blast furnace operation.

(A) SMELTING OF IRON ORES AND THE LIKE

After the rotary furnace according to the present invention is preheated by means of the heavy oil combustion device up to the temperature of above 1000° C., it is charged with an iron manufacturing material such as small-sized iron ores, powdered iron ores, lathe chips, scraps, scales, iron sands or any other material for making iron, a reducing agent for making a basic slag and flux such as coal, soda and silica, while rotating the same. Heating and smelting of the charge is carried out by burning heavy oil and utilizing the secondary hot air produced in the furnace. The temperature within the furnace may be freely regulated in a temperature range of 1000° to 1700° C. by utilizing the secondary hot air and also the atmosphere in the furnace may be easily regulated. As the rotary furnace being of conical form, the contents of the furnace may be moved in horizontal, vertical and lateral directions in co-operation of the action of gravity without causing any sliding movement in spite of the low speed rotation of the furnace. During the movement of the contents, comparatively large-sized and heavy lumps gather to the largest part of the furnace by their own rolling movement due to the rotation of the furnace. Because of this part of the furnace being liable to reach the highest temperature within the furnace, conditioned by the conical structure of the furnace and the state of the combustion flame, heating and smelting of the contents may be very quickly performed. When the iron bath is produced, lathe chips, scraps or cold pig irons and new slag-forming agent may be additionally charged to the bath, after the slag produced is removed by tilting the furnace, thereby the maximum utilization of the effective capacity of the furnace may be permitted. Thus, smelting of iron ores, lathe chips and scraps, which was not feasible in any conventional rotary drum furnace, can be carried out in a short time. It is also an advantage of the operation of the rotary furnace according to the present invention that a cheap dust coal of such low grade as can not be used for blast furnace, cupola or electric furnace may be used as a reducing agent. Moreover, the pig iron produced by this rotary furnace is specially adapted for making steel therefrom, because of its quality being superior in high basicity and low sulfur contents due to the basic operation and low impurities due to the low temperature operation.

(B) REFINING OF PIG IRON

After the iron bath and the interior of the furnace are sufficiently heated by the heavy oil combustion device, the latter is replaced by the oxygen blowing device and at the same time a required amount of a slag-forming agent comprising iron ores, scales, limes or fluorites is thrown into the bath. By blowing oxygen into the bath through the oxygen pipe vehement boiling of the bath takes place at the surface thereof, and the rapid rise of temperature occurs at that place. When a yellow colored flame of CO gas is produced, it is burnt within the furnace by means of the secondary air of high temperature. Thus, refining of the bath is effected while the temperature within the furnace being rapidly but uniformly elevated by the combustion of CO gas. When the flame shows a white color and becomes short in accordance with progress of the refining process, the oxygen blowing is stopped. The slag produced is scraped out by tilting the furnace after a sample is taken out and the temperature of the steel bath is measured. At the same time, the steel is tapped into a ladle, wherein Al, Fe-Si and Fe-Mn are thrown to effect the deoxidation of the steel. Or the steel may be tapped into a ladle after the slag is removed and the deoxidizing agents are thrown into the bath within the furnace. The steel and slag may be taken out either from the combustion port or the exhaust port. However, in view of the throttling angles on both port sides, it is preferable to tap the steel from the exhaust port and to remove the slag from the combustion port.

As to the temperature of the secondary air it is to be noted that it is well known that the lower the temperature of the secondary air the more the consumption of fuels and oxygen will be and the harder the maintenance of high temperature within the furnace will be, resulting in the elongation of refining time. Therefore, also in the present invention it is contemplated to utilize the secondary air of so high temperature as possible. However, in view of problems to be raised by the high temperature on the equipment the temperature range of 200° to 950° C. is adopted in the present invention, because this temperature range may be rather simply obtained by heat-exchange of the high temperature held by the waste gas by means of a heat exchange device set in the flue which leads the waste gas of the furnace.

In comparing the aforesaid operation of the conical-type rotary furnace with that of any conventional rotary drum furnace it is found that in spite of the low speed rotation of the furnace in the present invention a sufficient movement of the contents may be effected by their self-flow, without need of blowing oxygen under high pressure as required in the conventional rotary drum furnace, thereby the refining time may be remarkably shortened and the furnace floor may be protected against the wear thereof. Though the temperature of the bath is rapidly elevated by the boiling thereof, there occurs no danger of the furnace floor being corroded thereby, as oxygen is blown into the thickest part of the bath layer. Moreover, the present invention has such an advantage that as the CO gas generated is immediately burnt again by the secondary hot air and a heat generated thereby, including radiant heat, may be fully utilized to heat the bath by limiting the throttling angle on the exhaust port side to less than 30 degrees and more than 15 degrees, the temperature within in the furnace may be elevated quickly but uniformly without additionally blowing oxygen for combustion. Due to various advantages as above mentioned, the operation of the conical-type rotary furnace according to the present invention has much greater industrial and economic values than any conventional drum furnace. An example of the effects obtained by the present invention is shown by the fact that an amount of oxygen to be used per ton of steel ingot produced is more than 70 Nm.$^3$ and an amount of refractory material to be consumed per ton of steel ingot produced is more than 50 kc. in the conventional rotary drum furnace, whereas in the present invention an amount of oxygen is less than 50 Nm.$^3$ and an amount of consumption of refractory material is less than 30 kg.

For advantages to be obtained by the present invention it is further to be noted that various kinds of iron, steel and basic slag may be produced as it is feasible to remove the slag by tilting the furnace and add newly the slag-forming agent during the operation or to adjust the composition of the bath by adding alloys and other additives thereto. Particularly, the slag obtained by the present invention may be utilized as an infusible cement-clinker which is generally difficult to produce by the conventional iron manufacturing method.

Examples of the present invention shall be explained in the following. However, the present invention should not be limited to the following examples so long as it does not deviate from the above mentioned objects.

*Example 1*

Conical-type rotary furnace as of:
    Total interior length (L) _____ 253 cm.
    The largest interior diameter (R) _____ 120 cm.φ.
    The length of the part of the largest
        interior diameter (l) _____ 60 cm.

$$\frac{L}{R} = \frac{253}{120} \quad \text{———————————} \quad 2.11.$$

$$\frac{l}{L} = \frac{60}{253} \quad \text{———————————} \quad 0.24.$$

Throttling angle:
    On the combustion port side (α) ___ 30°58′.
    On the exhaust port side (β) _____ 15°15′.
    Caliber of the combustion port _____ 45 cm.φ.
    Caliber of the exhaust port _____ 50 cm.φ.
    Capacity of the furnace _____ 1.8 m.$^3$.
    Thickness of the furnace wall _____ 30 cm.
    Lining bricks _____ Mag-chro bricks.
    Rotating speed of the furnace
        body _____ 3 r.p.m.–0.5 r.p.m.

Provided with a heavy oil combustion device and an oxygen blowing device in which secondary air of high temperature can be used, and a device for tilting the furnace body in the longitudinal direction.

The interior of the above mentioned furnace was preheated to be above 1000° C., and the smelting and refining operations were carried out under the following conditions.

(a) Smelting operation:
Material charged: Lathe steel chip 350 kg., lathe iron chip 150 kg., scrap 100 kg., scale 50 kg., powdered coke 70 kg., limestone 50 kg. and silica sand 15 kg.
Temperature of secondary air: 200–450° C.
Time required for melting: 1 hour 20 minutes.
Consumption of heavy oil: 82 liters.
Temperature of molten pig iron: 1430° C.

Analysis composition of the molten pig iron sampled:

| | Percent |
|---|---|
| C | 3.22 |
| Si | 0.45 |
| Mn | 0.80 |
| S | 0.036 |
| P | 0.08 |

When the temperature of the molten pig iron was about 1430° C., the combustion device was removed, 50 kg. of each of scale and limestone were thrown into the furnace, the oxygen blowing device was set and the refinement was soon carried on at a temperature of 450° C. of secondary air and an oxygen feeding pressure of 5 kg./cm.$^2$. After the completion of the refining operation, the slag was scraped out by tilting the furnace. 0.85 kg. of Al, 1 kg. of Fe-Si and 3.2 kg. of Fe-Mn were thrown into the molten steel to deoxidate it and then the steel was taken out.

Time required for refining: 50 minutes
Temperature of the molten steel at the time of completion: 1630° C.
Amount of use of oxygen: 28 Nm.$^3$.
Time of blowing oxygen: About 35 minutes.
Weight of product steel: 560 kg.
Analysis composition of the product steel:

| | Percent |
|---|---|
| C | 0.15 |
| Si | 0.16 |
| Mn | 0.45 |
| S | 0.031 |
| P | 0.022 |

Weight of the product slag: 62 kg.
Analysis composition of the product slag:

| | Percent |
|---|---|
| $SiO_2$ | 21.32 |
| $Al_2O_3$ | 7.64 |
| $Fe_2O_3$ | 3.04 |
| CaO | 60.20 |
| MgO | 1.57 |
| $SO_3$ | 1.34 |

*Example 2*

By using the same conical-type rotary furnace as in Example 1, the operation was carried out under the following operation standards:

| Duration in hours and minutes | Operation standards |
|---|---|
| Hr.—min.: | |
| 0—0 | The temperature within the furnace was 1200° C., 600 kg. of iron sand, 210 kg. of powdered coke and 70 kg. of quicklime were put in. Heavy oil was burnt. Secondary air was at 670° C. |
| 1—0 | Secondary air was at 800° C. The temperature of molten pig iron was 1430° C. Sample (1) was taken. The furnace body was inclined. The slag was about 170 kg. The slag was completely removed. 200 kg. of lathe chip, 30 kg. of quicklime and 25 kg. of silica were thrown in. The burning of heavy oil was continued. |
| 1—20 | 200 kg. of lathe chip, 100 kg. of scrap iron, 20 kg. of quicklime and 15 kg. of silica were thrown in. |
| 1—40 | Secondary air was at 840° C. 20 kg. of lathe chip, 150 kg. of scrap iron and 25 kg. of quicklime were thrown in. |
| 2—0 | 400 kg. of scrap iron and 15 kg. of quicklime were thrown in. |
| 2—20 | Secondary air was 870° C. The temperature of the molten metal was 1850° C. Sample (2) was taken. 30 kg. of quicklime and 50 kg. of scale were thrown in. The blowing of oxygen began. |
| 2—35 | Secondary air was at 900° C. The temperature of the molten steel was 1650° C. The furnace body was inclined. The steel was taken out. The slag was removed. 2 kg. of Al, 8.6 kg. of Fe-Mn and 2.8 kg. of Fe-Si were thrown into the ladle. The steel was deoxidated. |

Time required for refining: 2 hours 40 minutes.
Amount of heavy oil used: 155 liters.
Time for burning heavy oil: 2 hours 20 minutes.
Amount of use of oxygen: 14 Nm.$^3$.
Time for blowing oxygen: 15 minutes.
Weights of the products:
  Steel—1470 kg.
  Cement slag (24.3% $SiO_2$ and 64.7% CaO)—150 kg.
Analysis compositions of the above mentioned samples (1) and (2) and product steel in percent:

| | C | Si | Mn | S | P |
|---|---|---|---|---|---|
| Sample (1) | 3.26 | 0.51 | 0.62 | 0.027 | 0.09 |
| Sample (2) | 0.79 | 0.81 | 0.21 | 0.024 | 0.05 |
| Product steel | 0.18 | 0.16 | 0.48 | 0.022 | 0.025 |

What I claim is:

1. A rotary furnace for smelting the iron manufacturing material into pig iron and refining said pig iron into steel comprising a conical form furnace body lined with basic refractory material having the throttling angle on the combustion port side of 50 to 30 degrees and the throttling angle on the exhaust port side of less than 30 degrees but more than 15 degrees, the ratio of the total interior length of the furnace (L) to the largest interior diameter of the furnace (R) being 1.8:1 to 3.0:1 and the length of the part of the largest interior diameter ($l$) being less than half of the total interior length of the furnace (L).

2. A rotary furnace for smelting the iron manufacturing material into pig iron and refining said pig iron into steel as claimed in claim 1, in which a heavy oil combustion device having a secondary air blowing device is fitted on the combustion port side to preheat the interior of the furnace and heat the contents of the furnace.

3. A rotary furnace for smelting the iron manufacturing material into pig iron and refining said pig iron into steel as claimed in claim 1, in which a removable oxygen blowing device having a secondary air blowing device is fitted on the combustion port side to refine pig iron by blowing oxygen and air into the furnace therethrough.

4. A rotary furnace for smelting the iron manufacturing material into pig iron and refining said pig iron into steel as claimed in claim 1, in which a secondary air pipe is opened at the position somewhat deviated from the center of the horizontal axis of the furnace towards the said center of the horizontal axis so as to cause the combustion flame to form the eddy current within the furnace.

5. A rotary furnace for smelting the iron manufacturing material into pig iron and refining said pig iron into steel as claimed in claim 1, in which a throttling angle on the combustion port side is 30°58′ and the throttling angle on the exhaust port side is 15°15′, the ratio of the total interior length of the furnace to the largest interior diameter of the furnace is 2.11:1 and the length of the part of the largest interior diameter is 0.24 of the total interior length of the furnace and comprising a removable heavy oil combustion device having a secondary air blowing device, and said oil combustion device being fitted on the combustion port side and used when preheating the interior of the furnace and heating contents of the furnace, an oxygen blowing device having a secondary air blowing device, said oxygen blowing device being laid on in place of said heavy oil combustion device when refining the molten pig iron, a device for tilting the furnace body in the longitudinal direction and a device for rotating the furnace body in the horizontal direction around the horizontal axis of the furnace.

References Cited by the Examiner
UNITED STATES PATENTS 2,258,850 10/1941 Eulenstein et al. ____ 25—52 X
2,936,230 5/1960 Larsen _____ 75—60 X WHITMORE A. WILTZ, *Primary Examiner.*